United States Patent [19]

Baily

[11] 4,365,928
[45] Dec. 28, 1982

[54] FLUID POWER CONNECTOR SYSTEM FOR MANIPULATOR

[75] Inventor: Oliver L. Baily, Cincinnati, Ohio

[73] Assignee: Cincinnati Milacron Inc., Cincinnati, Ohio

[21] Appl. No.: 260,386

[22] Filed: May 4, 1981

[51] Int. Cl.³ .............................................. B25J 17/02
[52] U.S. Cl. ..................................... 414/735; 414/4; 414/739; 294/88
[58] Field of Search .................. 414/732, 1, 4, 8, 735, 414/738, 739, 753, 737, 752; 294/88, 115; 285/11, 163

[56] References Cited

U.S. PATENT DOCUMENTS

| | | | |
|---|---|---|---|
| 3,677,419 | 7/1972 | Giffen | 414/732 X |
| 3,759,563 | 9/1973 | Kitamura | 414/4 X |
| 4,227,851 | 10/1980 | Beezer | 294/88 X |

FOREIGN PATENT DOCUMENTS 2226407 12/1973 Fed. Rep. of Germany .......... 414/4

Primary Examiner—Robert J. Spar
Assistant Examiner—Terrance L. Siemens
Attorney, Agent, or Firm—Thomas M. Farrell

[57] ABSTRACT

A manipulator has an end effector with a tool end movable with respect to a reference base by means of a multi-axis joint system. The joint system is contained within a housing to provide the relative movement through a mechanical power train. Fluid ducts are provided through both a first, duct component and a second, end effector power train component having an internal duct, extending into a housing plenum at first and second points, thereby providing fluid communication between the plenum and end effector. The housing has relatively movable sealed sections, and sealing means are provided at the interface of said first and second duct components with the housing.

3 Claims, 2 Drawing Figures

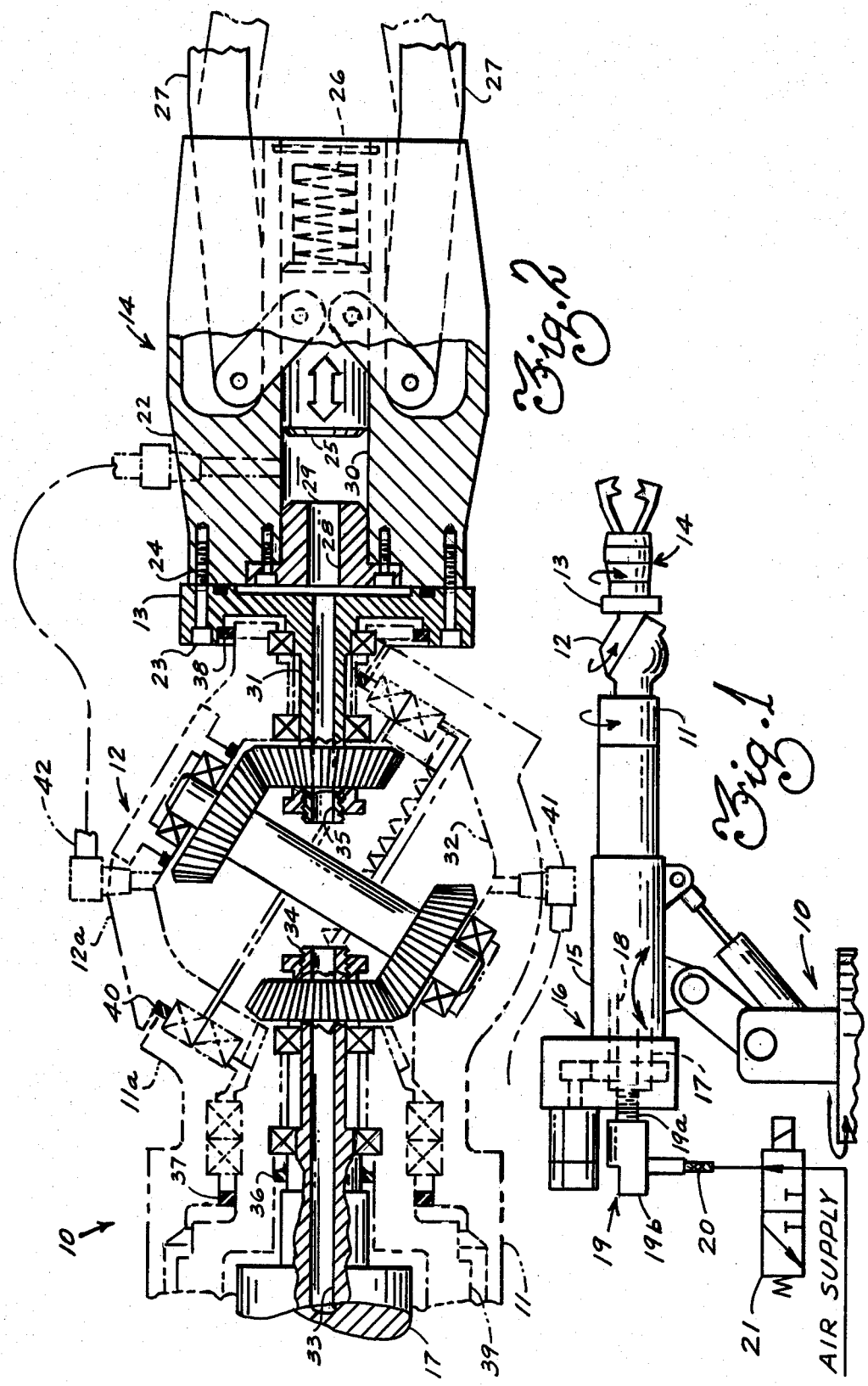

FLUID POWER CONNECTOR SYSTEM FOR MANIPULATOR

BACKGROUND OF THE INVENTION

The invention relates specifically to robot type manipulators, which, typically, may have at least an arm component and an end effector movable with respect to said arm, wherein the end effector supports a tool, such as a part gripper. Most often, it is necessary to provide motive power to the tool from a base portion of the machine, and the motive power is frequently pressurized fluid. In typical prior art assemblies, the fluid is conveyed from the base member to the end effector tool by fluid-carrying hoses which are draped along the assembly and arranged with slack to permit relative movement between the tool and the base. However, in manipulators having many individual or compound movements of relative parts it is possible that the hoses can inhibit the tool movement, and the hoses may themselves be damaged through flattening or rubbing on machine components as the arm is articulated.

Applicant has obviated many of the difficulties inherent in the prior art power hose designs by providing an assembly which minimizes the use of external hosing on a manipulator arm.

SUMMARY OF THE INVENTION

The invention is shown embodied in a robot-type manipulator having an end effector which is movable with respect to a reference base such as an articulated arm or boom. A multi-axis articulated joint system links the base to the end effector, and the joint drive is contained within a housing. An improved apparatus for connecting fluid motive power from the base to the end effector comprises a plurality of serial fluid ducts from the base to the end effector, including a plenum formed within the joint housing. The joint housing thus provides fluid communication between the drive components as the robot arm is articulated. Sealing means are provided at the drive components and joint housing to maintain varied fluid actuating pressure within the system.

BRIEF DESCRIPTION OF THE DRAWINGS

FIG. 1 is a side elevational view of an articulatable manipulator.

FIG. 2 is a section through the right hand end of the manipulator of FIG. 1.

DESCRIPTION OF THE PREFERRED EMBODIMENT

Referring to the drawings, FIG. 1 illustrates an articulatable manipulator 10 such as that described in U.S. Pat. No. 4,068,536, having rotary movement in the directions of the arrows of three individual elements: outer shaft 11; housing 12; and end effector 13. The outer shaft comprises a reference base for the relatively moveable end effector 13. The manipulator 10 is adapted with a tool, such as a gripper assembly 14, on its end effector 13 to grasp a workpiece (not shown), however, the tool might be any well-known tool which is employed on manipulator assemblies. A plurality of coaxial drive shafts are employed within the base portion 15 of the manipulator arm 16, and reference is made to the aforementioned patent for details of the coaxial drive assembly. The central drive shaft 17, which may be discerned in the reference patent, is provided with a coaxial duct, or bore 18, and a conventional rotary union 19 is threadably received in the left hand end of the arm 16. The threaded central portion 19a of the rotary union 19 is adapted to relatively rotate with respect to the outer housing 19b which is connected by a hose 20 to a fluid source, through a porting valve 21. Such rotary unions for providing fluid power to a rotatable shaft are well-known in the art, and are commercially available from many sources, so that detail of the union is omitted for purposes of this description.

The section illustrated in FIG. 2 shows the right hand end of the assembly of FIG. 1, wherein the relatively rotatable end effector 13 is secured to the housing 22 of the gripper assembly 14 by screws 23 and a fluid seal 24 is provided between the two 13,22. The gripper assembly 14 has a central piston 25 which is powered by fluid to the right and reverse-powered by a biasing spring 26 to close the gripper fingers 27 by a toggle mechanism known in the art and more particularly described, for example, in U.S. Pat. No. 4,185,866. A bore 28 is provided through the cylinder end cap 29 so that fluid may enter and leave the left hand cylinder portion 30 of the gripper housing 22. The end effector shaft 31 is rotatably supported in the joint housing 12, and the housing is formed by split relatively rotatable portions 11a,12a to accomplish the articulation of the assembly. In the design shown, the housing portion 11a is formed integrally with the outer shaft 11. The central drive shaft 17 extends into the interior chamber portion, or plenum 32, formed by the jointed housing portions 11a,12a. The bevel gear arrangement depicted in solid and phantom accomplishes the rotational movements of FIG. 1, either sequentially or simultaneously. The central duct 33 through the central drive shaft 17 extends through the end 34 of the shaft 17 and into fluid communication with the plenum 32 formed within the housing 12. A second duct 35 is formed through the end effector shaft 31 which likewise extends into fluid communication with the plenum 32. Seals 36, 37, 38 are provided around the coaxial drive shafts 11, 17, 39 of the manipulator 10 and around the end effector 13 so that they are sealed relative to the housing. The housing portions 11a,12a are also provided with a seal 40 to maintain fluid pressure within the plenum 32 as the housing portions 11a,12a are relatively moved with respect to one another. Therefore, it may be seen that pressurized fluid such as air may be brought through the central drive shaft 17; plenum 32; and end effector 13, to bring about an opening movement of the gripper fingers 27 of the gripper assembly 14 at a desired time. By permitting the escape of fluid through a porting valve 21 such as the solenoid-operated air valve shown, the biasing spring 26 will drive the piston 25 to the left, causing relief of air pressure and subsequent clamping of the gripper fingers 27.

While the fluid may be brought into the plenum 32 through the central drive shaft 17 as the outer shaft 11 is subject to continuous rotation, for the occasion when the outer shaft movement is more limited, the fluid may be optionally ducted into the housing plenum by employing an external hose assembly 41, and omitting the central duct 33 and rotary union 19. Similarly, when the end effector movement is limited, the fluid may be ducted from the housing plenum to the tool by employing an external hose assembly 42.

Here it should be noted that the tool employed on the end effector is not limited to grippers or even pistonoperated devices. For example, a diaphragm actuator of a pressure switch may be triggered with fluid pressure; a direct spray of pressurized fluid from the assembly may be utilized at a work station.

Additionally, while it has been discussed in conjunction with the assembly that a positive pressure would be commonly employed to actuate the piston, it is possible that negative pressure, or vacuum, might be employed to pull a piston type element or diaphragm in a desired direction. A combination of positive and negative pressure may be employed to accomplish desired movement. Thus, in the example illustrated, a negative pressure employed at the left hand end of the piston would act as an assist to the spring pressure applied to the fingers in the clamping mode.

While the jointed manipulator shown consists of a complex mechanism capable of providing multiple roll movements to the respective components, simpler mechanisms might be employed, which have only two rolling axes instead of the three depicted in FIG. 1. and, other types of jointed systems may be employed which do not have oblique shafts such as the manipulator of U.S. Pat. No. 4,068,536, but rather which have right angle shaft mountings within a joint housing. Any similar housing which contains the joint elements of a manipulator could conceiveably be a design candidate for the application of the present invention.

While the invention has been shown in connection with a specific design, it is not intended to limit the invention thereto, but rather, the invention encompasses all such designs and modifications as come within the scope of the appended claims.

What is claimed is:

1. In a manipulator having a reference base, an end effector with a tool end movable with respect to said reference base, a multi-axis joint system linking said base to said end effector through a joint housing, an improved apparatus for connecting fluid motive power from said base to said end effector, wherein the improvement comprises:
   (a) a plenum chamber within said joint housing, and said joint housing is split into a plurality of relatively movable housing parts;
   (b) means for ducting fluid from a fluid source into said plenum chamber, said means for ducting fluid being connected to one of said plurality of housing parts;
   (c) an end effector power train component connected to said housing and extending into said plenum chamber, said power train component being connected to another of said plurality of housing parts;
   (d) a fluid duct within said power train component in fluid communication with said plenum chamber and said tool end of said end effector;
   (e) means for sealing said component with said housing; and
   (f) means for sealing said housing parts with one another.

2. The apparatus of claim 1 further comprising means for providing multi-level fluid pressure within said plenum chamber.

3. The apparatus of claim 1 further comprising means for providing at least one positive gage pressure and at least one negative gage pressure within said plenum chamber.

* * * * *